United States Patent
Kosseifi et al.

(10) Patent No.: US 9,485,618 B2
(45) Date of Patent: *Nov. 1, 2016

(54) CLASSIFICATION OF INDOOR AND OUTDOOR TELECOMMUNICATIONS EVENTS OF MOBILE TELECOMMUNICATIONS NETWORKS

(71) Applicant: AT&T Mobility II LLC, Atlanta, GA (US)

(72) Inventors: Mario Kosseifi, Roswell, GA (US); Mark Austin, Roswell, GA (US); Jeremy Fix, Acworth, GA (US); Naeemul Hassan, Arlington, TX (US); Sheldon Kent Meredith, Marietta, GA (US)

(73) Assignee: AT&T Mobility II LLC, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/739,383

(22) Filed: Jun. 15, 2015

(65) Prior Publication Data
US 2015/0281885 A1 Oct. 1, 2015

Related U.S. Application Data

(63) Continuation of application No. 13/693,117, filed on Dec. 4, 2012, now Pat. No. 9,060,282.

(51) Int. Cl.
*H04W 24/00* (2009.01)
*H04W 4/02* (2009.01)
(Continued)

(52) U.S. Cl.
CPC ............ *H04W 4/02* (2013.01); *H04W 24/00* (2013.01); *H04W 24/10* (2013.01);
(Continued)

(58) Field of Classification Search
CPC ... H04W 24/00; H04W 24/08; H04W 24/10; H04W 4/02; H04W 4/043; H04W 16/18; H04W 16/20; H04W 64/00; H04W 28/0226

USPC ....... 455/456.1, 456.3, 456.2, 456.5, 521, 9, 455/7, 11.1, 13.1
See application file for complete search history.

(56) References Cited

U.S. PATENT DOCUMENTS

| 8,731,537 B2 * | 5/2014 | Moeglein | H04W 4/00 |
| | | | 455/115.1 |
| 9,060,282 B2 * | 6/2015 | Kosseifi | H04W 24/10 |

(Continued)

OTHER PUBLICATIONS

M. Sugano, T. Kawazoe, Y. Ohta, and M. Murata, "Indoor Localization System using RSSI Measurement of Wireless Sensor Network based on ZigBee Standard," Wireless Sensor Networks (WSN), 2006.

(Continued)

*Primary Examiner* — Khai M Nguyen
(74) *Attorney, Agent, or Firm* — Hartman & Citrin LLC (57) ABSTRACT

Concepts and technologies are described herein for the classification of indoor and outdoor telecommunications events that occur within mobile telecommunications networks. According to one aspect disclosed herein, a method for classifying telecommunications events can include receiving a data set that includes geo-location data and radio signal measurement data for a plurality of telecommunications events that have occurred within a mobile telecommunications network. The method can also include providing the data set as input to a classification model. The method can also include classifying the data set into an indoor results subset and an outdoor results subset using the classification model. The indoor results subset can include a first telecommunications event that is determined by the classification model to have occurred in an indoor location. The outdoor results subset can include a second telecommunications event that is determined by the classification model to have occurred in an outdoor location.

20 Claims, 4 Drawing Sheets

(51) Int. Cl.
*H04W 24/10* (2009.01)
*H04W 28/02* (2009.01)
*H04W 24/08* (2009.01)
*H04W 16/18* (2009.01)
*H04W 16/20* (2009.01)
*H04W 64/00* (2009.01)
*H04W 4/04* (2009.01)

(52) U.S. Cl.
CPC ........ *H04W 28/0226* (2013.01); *H04W 4/043* (2013.01); *H04W 16/18* (2013.01); *H04W 16/20* (2013.01); *H04W 24/08* (2013.01); *H04W 64/00* (2013.01)

(56) References Cited

U.S. PATENT DOCUMENTS

| | | | |
|---|---|---|---|
| 2009/0280827 A1* | 11/2009 | Michaud | G01S 5/0252 455/456.1 |
| 2010/0093374 A1 | 4/2010 | Dacosta | |
| 2012/0052872 A1 | 3/2012 | Do | |
| 2012/0058782 A1 | 3/2012 | Li | |
| 2013/0024431 A1 | 1/2013 | Parthasarathy et al. | |
| 2013/0090130 A1 | 4/2013 | Burrell et al. | |
| 2013/0106613 A1* | 5/2013 | Lee | H04W 4/021 340/691.3 |
| 2014/0002307 A1* | 1/2014 | Mole | G01S 5/0263 342/451 |

OTHER PUBLICATIONS

Youngjune Gwon, et al., "Robust Indoor Location Estimation of Stationary and Mobile Users," Twenty-third Annual Joint Conference of the IEEE Computer and Communications Societies (INFOCOM), 2004, pp. 1032-1043, vol. 2.

Cherntanomwong, P., "Indoor localization system using wireless sensor networks for stationary and moving target," 8th International Conference on Information, Communications and Signal Processing (ICICS), 2011, pp. 1-5.

Al Alawi, R., "RSSI based location estimation in wireless sensors networks," 17th IEEE International Conference on Networks (ICON), 2011, 118-122.

U.S. Office Action dated Aug. 5, 2014 in U.S. Appl. No. 13/693,117.

U.S. Office Action dated Dec. 15, 2014 in U.S. Appl. No. 13/693,117.

U.S. Notice of Allowance dated Feb. 12, 2015 in U.S. Appl. No. 13/693,117.

* cited by examiner

CLASSIFICATION OF INDOOR AND OUTDOOR TELECOMMUNICATIONS EVENTS OF MOBILE TELECOMMUNICATIONS NETWORKS

CROSS-REFERENCE TO RELATED APPLICATIONS

This application is a continuation of U.S. patent application Ser. No. 13/693,117, filed Dec. 4, 2012, now U.S. Pat. No. 9,060,282, the content of which is herein incorporated by reference in its entirety.

TECHNICAL FIELD

The concepts and technologies disclosed herein generally relate to mobile telecommunications. More specifically, the concepts and technologies disclosed herein relate to the classification of indoor and outdoor telecommunications events that occur within mobile telecommunications networks.

BACKGROUND

A mobile telecommunications carrier may allocate a significant portion of their annual budget to network planning, troubleshooting, and otherwise improving their network coverage in order to meet the needs of their customers. As a mobile telecommunications carrier expands their network to encompass rural, urban, and other land areas, the ability to determine whether a telecommunications event, such as a voice call or data session, occurred within a building or other indoor area or outdoors becomes increasingly difficult. Mobile telecommunications carriers may utilize predicted service demand, historic traffic usage, and/or demographics for planning network upgrades for areas in which they currently provide mobile telecommunications services, and for planning network expansion into areas in which they intend to provide mobile telecommunications services. These planning metrics, however, are not beneficial for determining the environment in which a telecommunications event occurred.

SUMMARY

Concepts and technologies are described herein that involve the classification of indoor and outdoor telecommunications events that occur within mobile telecommunications networks. According to one aspect disclosed herein, a method for classifying telecommunications events can include receiving a data set that includes geo-location data and radio signal measurement data for a plurality of telecommunications events that have occurred within a mobile telecommunications network. The method can also include providing the data set as input to a classification model. The method can also include classifying the data set into an indoor results subset and an outdoor results subset using the classification model. The indoor results subset can include a first telecommunications event of the plurality of telecommunications events that is determined by the classification model to have occurred in an indoor location. The outdoor results subset can include a second telecommunications event of the plurality of telecommunications events that is determined by the classification model to have occurred in an outdoor location.

According to another aspect disclosed herein, a computer system is provided. The computer system can include a processor and a memory. The memory can include a classification model and computer-executable instructions that, when executed by the processor, cause the processor to perform operations. The operations can include receiving a data set that includes geo-location data and radio signal measurement data for a plurality of telecommunications events that have occurred within a mobile telecommunications network. The operations can also include providing the data set as input to the classification model. The operations can also include classifying, using the classification model, the data set into an indoor results subset and an outdoor results subset. The indoor results subset can include a first telecommunications event of the plurality of telecommunications events that is determined by the classification model to have occurred in an indoor location. The outdoor results subset can include a second telecommunications event of the plurality of telecommunications events that is determined by the classification model to have occurred in an outdoor location.

According to another aspect disclosed herein, a computer-readable storage medium includes instructions that, when executed by a processor of a computer system, cause the processor to perform operations. The operations can include receiving a data set that includes geo-location data and radio signal measurement data for a plurality of telecommunications events that have occurred within a mobile telecommunications network. The operations can also include providing the data set as input to the classification model. The operations can also include classifying, using the classification model, the data set into an indoor results subset and an outdoor results subset. The indoor results subset can include a first telecommunications event of the plurality of telecommunications events that is determined by the classification model to have occurred in an indoor location. The outdoor results subset can include a second telecommunications event of the plurality of telecommunications events that is determined by the classification model to have occurred in an outdoor location.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Concepts and technologies are disclosed herein that involve the classification of indoor and outdoor telecommunications events that occur within mobile telecommunications networks. According to some of the concepts and technologies disclosed herein, a telecommunications event classification system can receive event information associated with a plurality of telecommunication events that have occurred within a mobile telecommunications network, and can utilize a classification model to classify one or more of the plurality of telecommunications events as having occurred in an indoor location and one or more of the plurality of telecommunications events as having occurred in an outdoor location. The results of the classification model can be presented in a spreadsheet or on map, for example. The results can be utilized by network planners and/or other entities for the purpose of network planning or troubleshooting, among others.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer system, including handheld devices, mobile devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, example aspects of the classification of indoor and outdoor telecommunications events that occur within mobile telecommunications networks will be presented.

Figure 1:
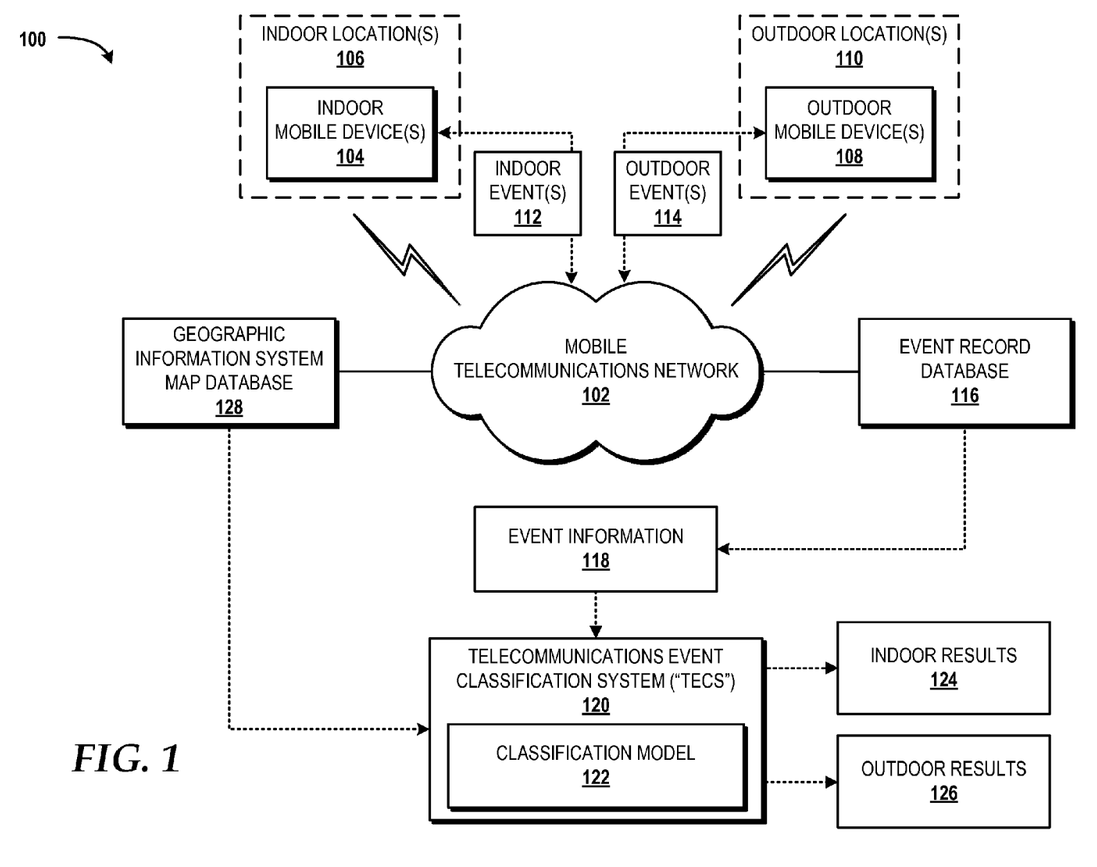
FIG. 1 is a block diagram illustrating aspects of an illustrative operating environment for various concepts disclosed herein.

Referring now to FIG. 1, aspects of an illustrative operating environment 100 for various concepts disclosed herein will be described. It should be understood that the operating environment 100 and the various components thereof have been greatly simplified for purposes of discussion. Accordingly, additional or alternative components of the operating environment 100 can be made available without departing from the embodiments described herein.

The operating environment 100 shown in FIG. 1 includes a mobile telecommunications network 102. The illustrated mobile telecommunications network 102 is configured to serve one or more indoor mobile devices 104 (hereinafter referred to collectively or generically as "indoor mobile devices 104") operating within one or more indoor locations 106 (hereinafter referred to collectively or generically as "indoor locations 106"). The illustrated mobile telecommunications network 102 is also configured to serve one or more outdoor mobile devices 108 (hereinafter referred to collectively or generically as "outdoor mobile devices 108") operating within one or more outdoor locations 110 (hereinafter referred to collectively or generically as "outdoor locations 110"). It should be understood that the indoor mobile devices 104 and the outdoor mobile devices 108 are described as being "indoor" and "outdoor," respectively, merely for ease of explanation, and therefore should not be interpreted as limiting the environment(s) in which the indoor mobile devices 104 and the outdoor mobile devices 108 are capable of operating. For example, the indoor mobile devices 104 may, at times, communicate with the mobile telecommunications network 102 from one of the outdoor locations 110 or in another location that may be classified as an indoor or outdoor environment. Similarly, the outdoor mobile devices 108 may, at times, communicate with the mobile telecommunications network 102 from one of the indoor locations 106 or in another location that may be classified as an indoor or outdoor environment.

The indoor locations 106 can include environments that are at least partially enclosed by one or more barriers to radio frequency signals. A barrier to radio frequency signals may be man-made or natural. Some examples of environments that are at least partially enclosed by a man-made barrier to radio frequency signals are buildings, single family homes, duplexes, triplexes, apartments, condominiums, stadiums, coliseums, theaters, or any combination thereof. Man-made barriers may be temporary in nature, such as tents, port-a-potties, stages, and the like. Some examples of natural barriers to radio frequency signals include environments that are dense with vegetation, such as trees, bushes, grasses, flowers, and other plants. Other examples of the indoor locations 106 include environments such as alleyways, subway tunnels, sewers, and the like. The indoor locations 106 can additionally or alternatively include the interiors of vehicles. The indoor locations 106 can include environments that are not at least partially enclosed by one or more barriers to radio frequency signals.

The mobile telecommunications network 102 can include one or more radio access networks ("RANs"). The mobile telecommunications network 102 can also include a wireless wide area network ("WWAN"), which may, in turn, include a circuit-switched core network ("CS CN"), a packet-switched core network ("PS CN"), and/or an IP multimedia subsystem ("IMS") core network. The WWAN can utilize one or more mobile telecommunications technology standards to provide voice and/or data services via one or more RANs to one or more WWAN components of the indoor mobile devices 104 and the outdoor mobile devices 108. The mobile telecommunications technology standards may include, but are not limited to, Global System for Mobile communications ("GSM"), Code Division Multiple Access ("CDMA") ONE, CDMA2000, Universal Mobile Telecommunications System ("UMTS"), Long-Term Evolution ("LTE"), Worldwide Interoperability for Microwave Access ("WiMAX"), and/or the like.

A RAN can utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and/or the like to provide a radio/air interface to the indoor mobile devices 104 and the outdoor mobile devices 108. A RAN may be a GSM RAN ("GRAN"), a GSM EDGE RAN ("GERAN"), a UMTS Terrestrial Radio Access Network ("UTRAN"), an E-UTRAN, any combination thereof, and/ or the like. The indoor mobile devices 104 and the outdoor mobile devices 108 can communicate with one or more RANs that utilize the same or different radio access technologies. As such, in some embodiments, the indoor mobile devices 104 and/or the outdoor mobile devices 108 are multi-mode communications devices.

Data communications can be provided by the mobile telecommunications network 102 using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access standards. The mobile telecommunications network 102 may be configured to provide voice and/or data communications with any combination of the above technologies. The mobile telecommunications network 102 may be configured to or adapted to provide voice and/or data communications in accordance with future generation technologies.

Each of the indoor mobile devices 104 and the outdoor mobile devices 108 may be a cellular telephone, a smartphone, a mobile computer, a tablet computer, or other computing device that is configured to communicate with the mobile telecommunications network 102 via a radio/air interface. As such, each of the indoor mobile devices 104 and the outdoor mobile devices 108 can include one or more radio access components configured to connect to the mobile telecommunications network 102. The indoor mobile devices 104 and the outdoor mobile devices 108 may initiate, receive, and/or maintain voice calls with one or more other voice-enabled telecommunications devices such as other mobile devices or landline devices (not shown). The indoor mobile devices 104 and the outdoor mobile devices 108 may also exchange Short Message Service ("SMS") messages, Multimedia Message Service ("MMS") messages, email, and/or other messages with other devices (not shown). The indoor mobile devices 104 and the outdoor mobile devices 108 may also establish data sessions with the mobile telecommunications network 102 to access the Internet (not shown) or another data network (also not shown) for content such as Websites, streaming media, online video games, downloadable content, and the like.

Voice calls, messaging service messages, and data sessions are collectively referred to herein as "telecommunications events." In the illustrated example, the mobile telecommunications network 102 is configured to facilitate one or more indoor telecommunications events 112 (hereinafter referred to collectively or generically as "indoor events 112") originating from or terminating at the indoor mobile devices 104. Also in the illustrated example, the mobile telecommunications network 102 is configured to facilitate one or more outdoor telecommunications events 114 (hereinafter referred to collectively or generically as "outdoor events 114") originating from or terminating at the outdoor mobile devices 108.

The indoor events 112 and the outdoor events 114 can be associated with information such as radio signal measurement data, geo-location data, and other event-related data. The radio signal measurement data can be representative of the radio conditions experienced by the indoor mobile devices 104 and the outdoor mobile devices 108 during the indoor events 112 and the outdoor events 114, respectively. In some embodiments, the radio signal measurement data can include, but is not limited to, received signal strength indicator ("RSSI"), received signal code power ("RSCP"), energy per user equipment ("$E_C$"), total noise power density ("$N_0$"), equivalent measurements, similar measurements, or any combination thereof.

RSSI is a generic radio receiver technology metric. RSSI provides a measurement of the power present in a received radio signal. Generally, the power is measured in dBm (milliwatt on a logarithmic scale) unit, and the value ranges from −105 dBm to −15 dBm. The value of RSSI depends upon the terrain, clutters, customer density, and neighbor cell towers of an area served by the mobile telecommunications network 102.

RSCP is the power measured by a receiver on a specific physical communication channel according to UMTS. Other similar measurements for received power may be utilized, such as reference signal received power ("RSRP") for embodiments in which the mobile telecommunications network 102 operates in accordance with LTE standards. Generally, RSCP is measured by a user equipment, such as one of the indoor mobile devices 104 or one of the outdoor mobile devices 108, and reported to a cell tower, such as a NodeB, eNodeB, or the like operating within the mobile telecommunications network 102. Like RSSI, the measurement unit for RSCP and RSRP is dBm, and the value ranges from −105 dBm to −15 dBm. RSCP and RSRP are used as indications of signal strength in decision making processors, such as handover.

$E_C/N_0$ ("$E_CN_0$") or RSCP/RSSI can provide insight into the signal quality of the signal received per user equipment. The higher the value of $E_CN_0$, the more distinguished a signal is from overall noise. $E_CN_0$ can be expressed in dB. The range of $E_CN_0$ is generally from −25 dB to −9 dB.

In the logarithmic scale, RSSI is equal to RSCP-$E_CN_0$. The transition of the aforementioned measurements throughout a telecommunications event can be measured by the indoor mobile devices 104 and the outdoor mobile devices 108, and more particularly, one or more applications being executed by one or more processors thereof. In some implementations, RSSI, RSCP, and $E_CN_0$ are measured at three timestamps: ACCESS_RSSI, START_RSSI, and END_RSSI. ACCESS_RSSI is the RSSI measured before the initiation of system access procedures. START_RSSI is the RSSI measured immediately after the establishment of the radio link. END_RSSI is the RSSI measured immediately prior to release of the radio link. Similarly, ACCESS_RSCP, ACCESS_$E_CN_0$, START_RSCP, START_$E_CN_0$, END_RSCP, and END_$E_CN_0$ can be measured.

The indoor events 112 and the outdoor events 114 can also be associated with features. As used herein, a "feature" can include a part of a telecommunications event that distinguishes, at least in part, the telecommunications event from another telecommunications event. It is contemplated that some telecommunications events may have similar or the same features.

Features are described herein as being to one of two feature types—primary features or secondary features. Primary features are features that can be acquired directly by a mobile device, such as one of the indoor mobile devices 104 or one of the outdoor mobile devices 108. Secondary features are features that can be derived from one or more primary features. In some embodiments, a mobile device acquires or calculates one or more features through one or more applications being executed on the mobile device by one or more processors of the mobile device.

Primary features can include, but are not limited to, a start location, an end location, a start cell location, an end cell location, and an event duration. Secondary features can include, but are not limited to, a handover, a moved distance, a speed, a start location to start cell location distance, an end location to end cell location distance, an average of these distances, and a moving status. The aforementioned primary and secondary features are now described in greater detail.

The start location can include latitude and longitude of a mobile device when a telecommunication event is started. In some implementations, the start location is represented as Start_Lat, Start_Long, wherein Start_Lat represents the latitude at which an associated mobile device is located when a telecommunication event is started, and wherein Start_Long represents the longitude at which the mobile device is located when the telecommunications event is started.

The end location can include latitude and longitude of a mobile device when a telecommunication event is ended. In some implementations, the end location is represented as End_Lat, End_Long, wherein End_Lat represents the latitude at which an associated mobile device is located when a telecommunication event is ended, and wherein End_Long represents the longitude at which the mobile device is located when the telecommunications event is ended.

The start cell location can include a global identifier ("ID") of the cell tower (i.e., base transceiver station, NodeB, eNodeB, or the like) that serves a mobile device when a telecommunications event is started. In some implementations, the start cell location is represented as Start_CID, wherein CID is the cell ID of the cell tower serving the mobile device when the telecommunications event is started.

The end cell location can include a global ID of the cell tower (i.e., base transceiver station, NodeB, eNodeB, or the like) that serves a mobile device when a telecommunications event is ended. In some implementations, the end cell location is represented as End_CID, wherein CID is the cell ID of the cell tower serving the mobile device when the telecommunications event is ended.

The event duration can include a total duration of the telecommunications event. For example, if the telecommunications event is a voice call, the event duration can include a total duration of the voice call including ringing time and talk time. Alternatively, for example, if the telecommunications event is a data session, the event duration can include the total duration of the data session. Telecommunications events that include messaging service messages may or may not have an event duration feature associated therewith. In some voice call implementations, the event duration is represented as Call_Duration.

The handover can include a value, wherein a "0" represents a condition under which the start cell location equals the end cell location, and wherein a "1" represents cases otherwise. In some implementations, the handover is represented as Handover.

The moved distance can include the distance between the start location and the end location. In some implementations, the moved distance is represented as the distance between (Start_Lat, Start_Long) and (End_Lat, End_Long), or Moved_Distance=|(Start_Lat, Start_Long)−(End_Lat, End_Long)|.

The speed can include a speed at which a mobile device is moving. The speed can be the moved distance divided by the call duration. In some implementations, the speed is represented as Speed=Moved_Distance÷Call_Duration.

The start location to the start cell location distance can be represented as the U2S_Distance. In some implementations, U2S_Distance=|(Start_Lat, Start_Long)−Start_CID|.

The end location to end cell location distance can be represented as the U2E_Distance. In some implementations, U2E_Distance=|(End_Lat, End_Long)−End_CID|.

The average of the U2S_Distance and the U2E_Distance can be represented as the U2C_Distance. In some implementations, this average is the average of the U2S_Distance and the U2E_Distance, or U2C_Distance=(U2S_Distance+U2E_Distance)÷2.

The moving status can include "stationary" if the speed (Speed) is equal to "0". The moving status can include "on foot" if the speed (Speed) is greater than "0" and less than or equal to 10 miles per hour or some other value representative of a maximum "on foot" speed. The moving status can include "in vehicle" if the speed (Speed) is greater than 10 miles per hour or some other value.

In addition to radio signal measurements and features, the indoor events 112 and the outdoor events 114 can be associated with one or more flags. As used herein, a "flag" can indicate a problem, including, but not limited to, a problem with coverage provided by the mobile telecommunications network 102, a problem with a certain element of the mobile telecommunications network 102 such as a base station, a power source failure problem, an issue with a mobile device such as one of the indoor mobile devices 104 or one of the outdoor mobile devices 108, a telecommunications event establishment problem, or a telecommunications event failure. As also used herein, a "flag" can indicate a success, including, but not limited to, a successful establishment of a telecommunications event or a successful ending of a telecommunications event. Some illustrative flags include, but are not limited to, Establish_Failed, Dropped, Connected, and Ended_Normal.

Establish_Failed can be represented by a "true" value or a "false" value in which a "true" value indicates the failure of a telecommunications event to establish correctly. For example, a voice call terminating at one of the indoor mobile devices 104 may not establish due to poor coverage within one of the indoor locations 106. Accordingly, the indoor event associated with this telecommunications event can include an Establish_Failed flag with a value of "true."

Dropped can be represented by a "true" value or a "false" value in which a "true" value indicates the drop or other failure of a telecommunications event after the telecommunications event has been successfully established. For example, a voice call may drop during handover between two cell towers. Accordingly, the voice call may be associated with a Dropped flag value of "true" to indicate a call drop occurred.

Connected can be represented by a "true" value or a "false" value in which a "true" value indicates the successful connection of a telecommunications event. For example, a voice call that connected successfully can be flagged with a Connected flag value of "true" to indicate successful connection.

Ended_Normal can be represented by a "true" value or a "false" value in which a "true" value indicates the successful ending of a telecommunications event. For example, a voice call that ends normally can be flagged with an Ended_Normal flag value of "true" to indicate a successful ending of the voice call.

It should be understood that Dropped and Ended_Normal are not just inverse of each other. If Dropped is equal to "true", Ended_Normal is "false." However, Ended_Normal can also be "false" for other reasons such as, but not limited to, coverage problem, power source failure problem, device issues, and the like. Similarly, Establish_Failed and Connected are not inverses of each other.

At least a portion of the available radio signal measurement data, the feature(s), and/or the flags for a given telecommunications event can be stored as part of an event record in an event record database 116. The event record database 116 can store event data records associated with the indoor events 112 and the outdoor events 114. In some embodiments, an event data record is or includes a charging data record. A charging data record can include information such as, but not limited to, calling party number, called party number, date and time of call initiation, date and time of call termination, duration of event, number charged for event, identifier of the network component that generated the record, identifier of the record, result of the event (e.g., answered, busy, dropped, and the like), event type (e.g., voice call, messaging, data), any faults that occurred during the event, radio signal measurements, features, flags, or any combination thereof.

The event record database 116 can provide event information 118, including radio signal measurement data, features, and flags, associated with the indoor events 112 and the outdoor events 114 to a telecommunications event classification system 120 ("TECS" in the drawings). The telecommunications event classification system 120 receives the event information 118 without knowledge of the origin of the events 116 in terms of the location(s) of the indoor mobile devices 104 and the outdoor mobile devices 108 during the indoor events 112 and the outdoor events 114, respectively. Accordingly, from the perspective of the telecommunications event classification system 120, the event information 118 associated with the indoor events 112 and the outdoor events 114 is received as input including information regarding telecommunications events, without the distinction of these events having occurred indoors or outdoors from the perspective of a human observer.

The indoor locations 106 are intended to illustrate real-world locations that are partially enclosed by one or more barriers to radio frequency signals. The outdoor locations 110 are intended to illustrate real-world locations that are not enclosed by one or more barriers to radio frequency signals. An opinion of a human observer that a particular location is observable and understandable to be "indoor" or "outdoor" is irrelevant to the characteristics of the radio environment that are shaped by the presence, or lack thereof, of one or more barriers to radio frequency signals. In other words, one of the indoor locations 106, for example, could be a location that is observable and understandable by a human observer to be outdoors in a forest, but the one or more barriers to radio frequency signals caused by vegetation within the forest are indicative of an indoor location in terms of the radio environment shaped at least in part by the vegetation.

The telecommunications event classification system 120 utilizes a classification model 122 to determine whether the telecommunications events associated with the event information 118 occurred indoors or outdoors, such as in one or more of the indoor locations 106 and/or one or more of the outdoor locations 110. The telecommunications event classification system 120 can output indoor results 124 that are representative of a subset of the telecommunications events associated with the event information 118 that are determined by the classification model 122 to have occurred in the indoor locations 106. The telecommunications event classification system 120 can also output outdoor results 126 that are representative of a subset of the telecommunications events associated with the event information 118 that are determined by the classification model 122 to have occurred in the outdoor locations 110.

For example, information such as the geographic location of a mobile device during a voice call, the radio signal measurements associated with the voice call, one or more features of the voice call, and/or one or more flags of the voice call can be provided to the telecommunications event classification system 120 without an indication that the voice call positively occurred in an indoor location, such as one of the indoor locations 106, or an outdoor location, such as one of the outdoor locations 110. The telecommunications event classification system 120 can provide this information to the classification model 122 as input to predict if the voice call occurred in an indoor location or an outdoor location. The indoor results 124 or the outdoor results 126 can reflect the classification (i.e., prediction) of the voice call as having occurred in an indoor location or an outdoor location, respectively.

The telecommunications event classification system 120 can present the indoor results 124 and/or the outdoor results 126 on one or more displays that are in wired or wireless communication with the telecommunications event classification system 120. A display can be an output device configured to present information in a visual form. In some embodiments, a display is a liquid crystal display ("LCD") utilizing any active or passive matrix technology and any backlighting technology (if used). In some embodiments, a display is an organic light emitting diode ("OLED") display. Other display types, such as plasma, cathode ray tube ("CRT"), and future display technologies, are also contemplated. In some embodiments, a display includes a touchscreen configured to detect the presence and location of a touch, and thereby provide an input mechanism through the display. The telecommunications event classification system 120 can also support other input mechanisms such as keyboards and mice.

The telecommunications event classification system 120 can present the indoor results 124 and/or the outdoor results 126 to a remote computing system (not shown). In some embodiments, the remote computing system is accessible via the Internet and/or other data network to remotely view and interact with the indoor results 124 and/or the outdoor results 126.

In some embodiments, the indoor results 124 and/or the outdoor results 126 are presented in a spreadsheet, wherein telecommunications events are identified as being either indoor or outdoor telecommunications events. The spreadsheet can additionally include at least a portion of the event information 118 that is associated with one or more of the indoor results 124 and/or one or more of the outdoor results 126.

In some embodiments, the indoor results 124 and/or the outdoor results 126 are presented in a map, wherein the indoor results 124 are represented on the map in one manner and the outdoor results 126 are represented on the map in another manner. The manner in which the indoor results 124 and the outdoor results 126 are represented on the map can take any number of visual forms, including, but not limited to, shapes, icons, pictures, graphics, call-outs, pop-ups, or combinations thereof. These visual forms can be in any color, shape, size, and orientation. Moreover, these visual forms can be in two-dimensions or three-dimensions.

Map data can be obtained from a geographic information system ("GIS") map database 128. The GIS map database 128 is configured to store maps, such as ortho-photo maps and latitude/longitude coordinates mapped to street addresses or other locations. It should be understood that map data can be obtained from other sources.

The classification model 122 can be generated by the telecommunications event classification system 120 or another computer system using one or more data sets. The classification model 122, in some embodiments, is based upon logistic regression. In some other embodiments, the classification model 122 is based upon a neural network. Moreover, in some embodiments, the classification model 122 is optimized by using techniques, such as, but not limited to, Newton Raphson Ridging, Quasi Newton, and Conjugate Gradient.

The event information 118 can be provided to the classification model 122 by the telecommunications event classification system 120 in a set of measures (radio signal measurements, features, flags) represented as $X=\{x_1, x_2 \ldots x_n\}$. Each event record, c, can be expressed as $\{x_1{}^c, x_2{}^c, x_n{}^c\}$, where $x_i{}^c$ denotes c's value on the $i^{th}$ member of X. The determination regarding whether c is from an indoor location or an outdoor location can be based upon $x_i{}^c$, where $1 \le i \le n$. The classification model 122 therefore provides a solution to this binary classification problem.

Figure 2:
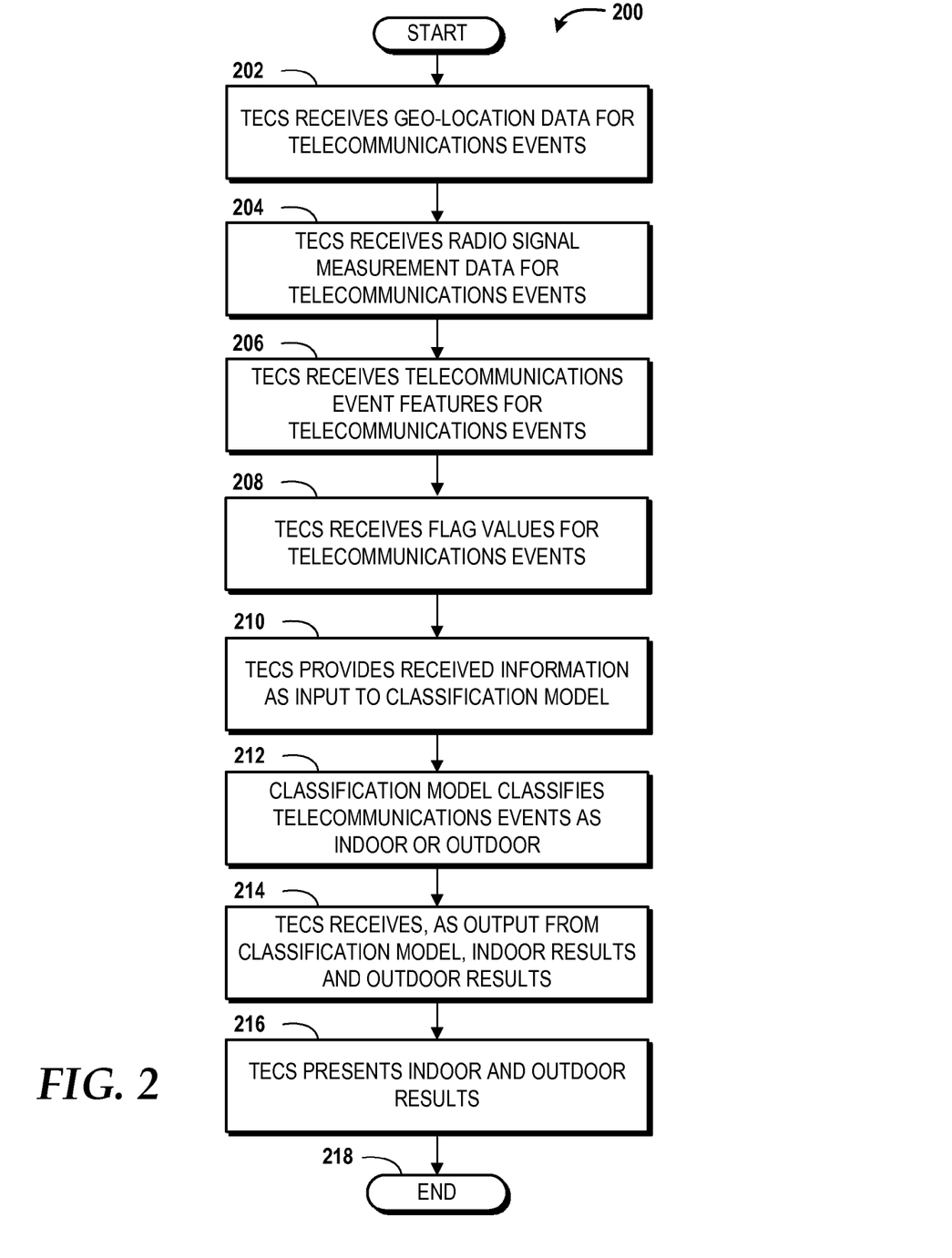
FIG. 2 is a flow diagram illustrating aspects of a method for predicting whether a telecommunications event occurred in an indoor location or in an outdoor location, according to an illustrative embodiment.

Turning now to FIG. 2, a flow diagram illustrating aspects of a method 200 for predicting whether a telecommunications event occurred in an indoor location or in an outdoor location will be described, according to an illustrative embodiment. It should be understood that the operations of the illustrative methods disclosed herein are not necessarily presented in any particular order and that performance of some or all of the operations in an alternative order(s) is possible and is contemplated. The operations have been presented in the demonstrated order for ease of description and illustration. Operations may be combined, separated, added, omitted, modified, and/or performed simultaneously or in another order without departing from the scope of the subject disclosure.

It also should be understood that the illustrated methods can be ended at any time and need not be performed in their entirety. Some or all operations of the methods, and/or substantially equivalent operations, can be performed by execution of computer-executable instructions included on a computer-readable storage media, as defined below. The term "computer-executable instructions," and variants thereof, as used in the description and claims, is used expansively herein to include routines, application programs, software, application modules, program modules, components, data structures, algorithms, and the like. Computer-executable instructions can be implemented on various system configurations, including single-processor or multi-processor systems, distributed computing systems, mini-computers, mainframe computers, personal computers, hand-held computing devices, microprocessor-based, programmable consumer electronics, combinations thereof, and the like. As used herein, "cause a processor to perform operations" includes causing a processor of a computing system or computing device, such one or more of the indoor mobile devices 104, one or more of the outdoor mobile devices 108, or the telecommunications event classification system 120, to perform one or more operations of the operations and/or causing the processor to direct other components of the computing system or computing device to perform one or more of the operations.

Thus, it should be appreciated that the logical operations described herein may be implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

The method 200 begins and proceeds to operation 202, wherein the telecommunications event classification system 120 receives geo-location data for a plurality of telecommunications events, such as the indoor events 112 and the outdoor events 114. From operation 202, the method 200 proceeds to operation 204, wherein the telecommunications event classification system 120 receives radio signal measurement data for the telecommunications events. From operation 204, the method 200 proceeds to operation 206, wherein the telecommunications event classification system 120 receives telecommunications event features for the telecommunications events. In some embodiments, the telecommunication event features include primary features and at least one secondary feature derived from the primary features. From operation 206, the method 200 proceeds to operation 208, wherein the telecommunications event classification system 120 receives flag values for the telecommunications events.

In some embodiments, at least a portion of the geo-location data, the radio signal measurement data, the telecommunications event features, and the flag values is received in one or more event records from the event record database 116. Alternatively, at least a portion of the geo-location data, the radio signal measurement data, the telecommunications event features, and the flag values is received from one or more network elements, such as cell towers, mobile location centers, location registers, radio network controllers, switches, or some combination thereof, that operate within the mobile telecommunications network 102. In some embodiments, at least a portion of the geo-location data, the radio signal measurement data, the telecommunications event features, and the flag values is generated by one or more applications being executed by one or more processors of the indoor mobile devices 104 and the outdoor mobile devices 108.

From operation 208, the method 200 proceeds to operation 210, wherein the telecommunications event classification system 120 provides the information received at operations 202-208 as input to the classification model 122. From operation 210, the method 200 proceeds to operation 212, wherein the classification model 122 classifies at least a portion of the telecommunications events as either an indoor event or an outdoor event. From operation 212, the method 200 proceeds to operation 214, wherein the telecommunications event classification system 120 receives, as output from the classification model 122, the indoor results 124 and the outdoor results 126. From operation 214, the method proceeds to operation 216, wherein the telecommunications event classification system 120 presents the indoor results 124 and the outdoor results 126 in a spreadsheet or on a map, for example. The results can be utilized for the purposes of network planning or troubleshooting, among others. From operation 216, the method 200 proceeds to operation 218, wherein the method 200 may end.

Figure 3:
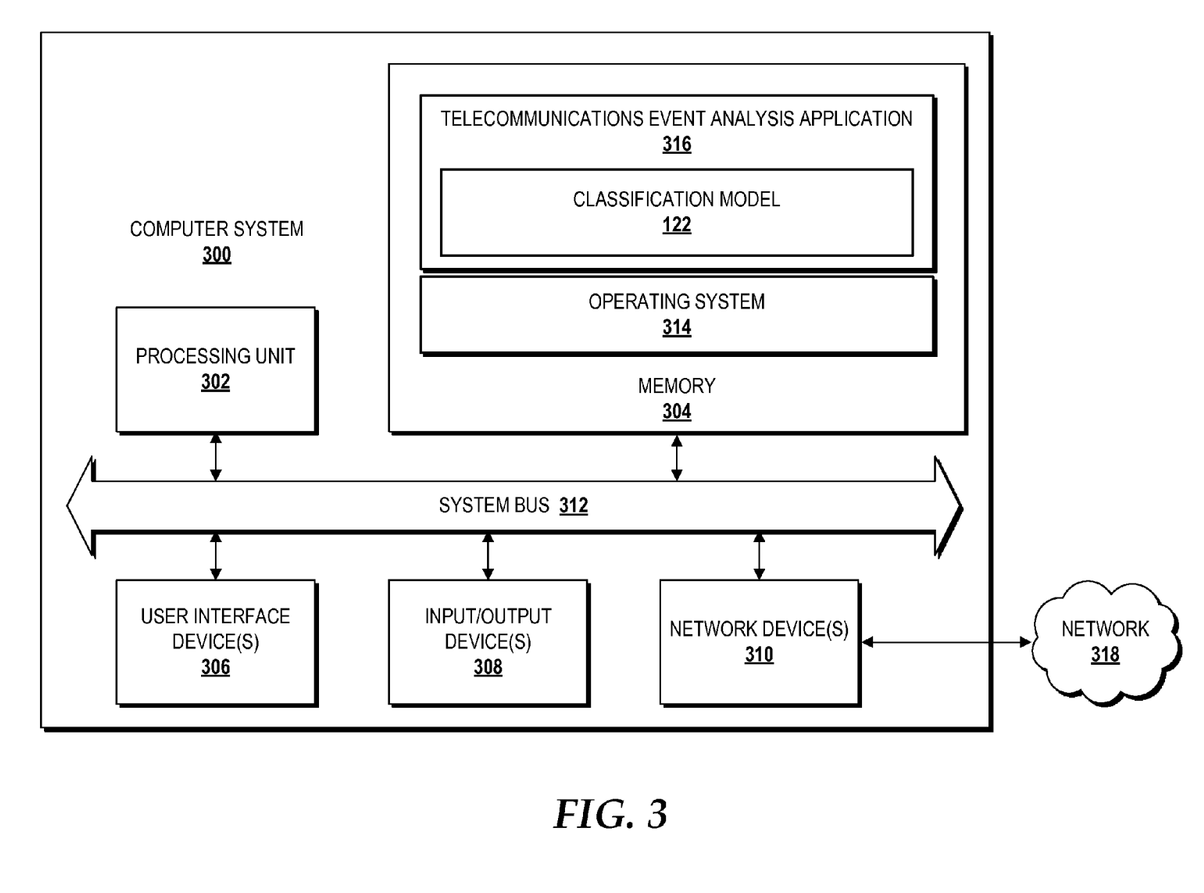
FIG. 3 is a block diagram illustrating an example computer system capable of implementing aspects of the embodiments presented herein.

FIG. 3 is a block diagram illustrating a computer system 300 configured to perform various operations disclosed herein. The computer system 300 includes a processing unit 302, a memory 304, one or more user interface devices 306, one or more input/output ("I/O") devices 308, and one or more network devices 310, each of which is operatively connected to a system bus 312. The system bus 312 enables bi-directional communication between the processing unit 302, the memory 304, the user interface devices 306, the I/O devices 308, and the network devices 310. In some embodiments, the telecommunications event classification system 120 is configured like the computer system 300. It should be understood, however, that the telecommunications event classification system 120 may include additional functionality or include less functionality than now described.

The processing unit 302 may be a standard central processor that performs arithmetic and logical operations, a more specific purpose programmable logic controller ("PLC"), a programmable gate array, or other type of processor known to those skilled in the art and suitable for controlling the operation of the computer system 300. Processing units are generally known, and therefore are not described in further detail herein.

The memory 304 communicates with the processing unit 302 via the system bus 312. In some embodiments, the memory 304 is operatively connected to a memory controller (not shown) that enables communication with the processing unit 302 via the system bus 312. The illustrated memory 304 includes an operating system 314 and a telecommunications event analysis application 316. The memory 304 can include additional applications for execution at least in part by the processing unit 302.

The operating system 314 can include, but is not limited to, members of the WINDOWS, WINDOWS CE, WINDOWS MOBILE, and/or WINDOWS PHONE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS and/or iOS families of operating systems from APPLE INC., the FREEBSD family of operating systems, the SOLARIS family of operating systems from ORACLE CORPORATION, other operating systems such as proprietary operating systems, and the like. The telecommunications event analysis application 316 can execute on top of the operating system 314 to provide functionality such as described herein above with reference to the method 200 illustrated in FIG. 2.

The user interface devices 306 may include one or more devices that a user utilizes to access the computer system 300. The user interface devices 306 may include, but are not limited to, computers, servers, personal digital assistants, telephones (e.g., cellular, IP, or landline), or any suitable computing devices. The I/O devices 308 enable a user to interface with the program modules. In one embodiment, the I/O devices 308 are operatively connected to an I/O controller (not shown) that enables communication with the processing unit 302 via the system bus 312. The I/O devices 308 may include one or more input devices, such as, but not limited to, a keyboard, a mouse, or an electronic stylus. Further, the I/O devices 308 may include one or more output devices, such as, but not limited to, a display screen or a printer.

The network devices 310 enable the computer system 300 to communicate with other networks or remote systems via a network 318, such as the mobile telecommunications network 102, illustrated and described with reference to FIG. 1, and/or other network(s). Examples of the network devices 310 include, but are not limited to, a modem, a radio frequency ("RF") or infrared ("IR") transceiver, a telephonic interface, a bridge, a router, or a network card. The network 318 may include other networks including a wireless network such as, but not limited to, a WLAN such as a WI-FI network, a WWAN, a wireless PAN ("WPAN") such as BLUETOOTH, or a wireless MAN ("WMAN"). Alternatively, the network 318 may include a wired network such as, but not limited to, a WAN such as the Internet, a LAN such as the Ethernet, a wired PAN, or a wired MAN.

Figure 4:
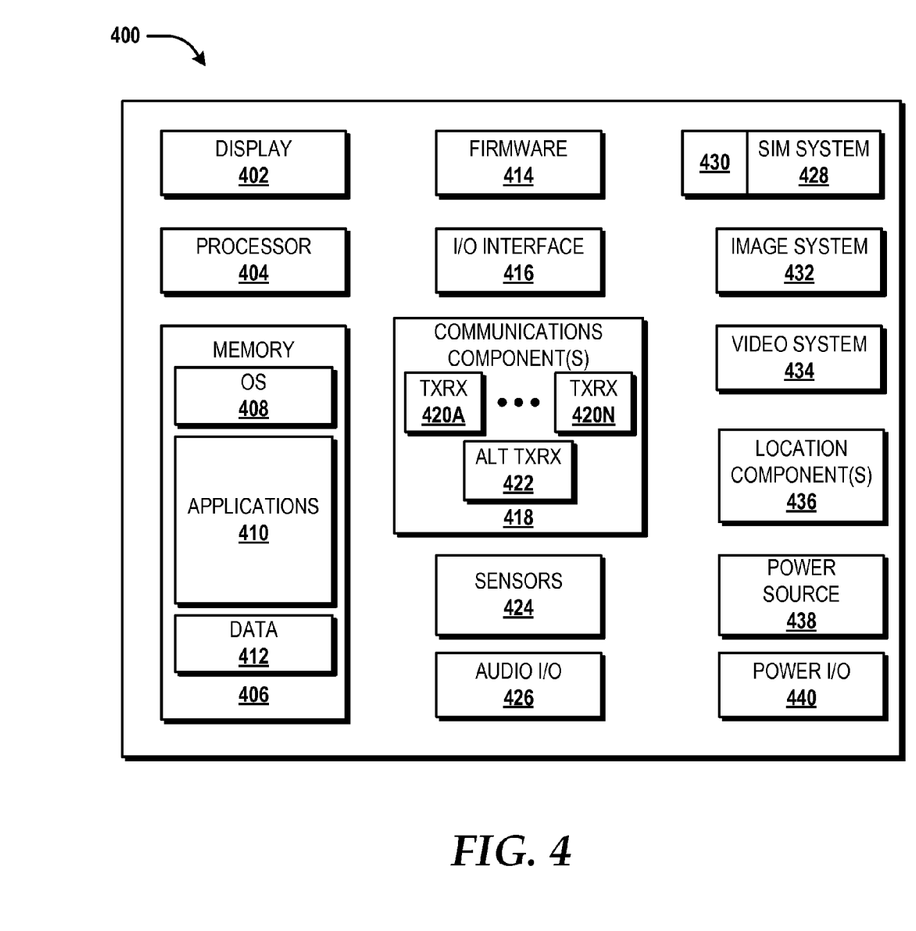
FIG. 4 is a block diagram illustrating an example mobile device capable of implementing aspects of the embodiments disclosed herein.

Turning now to FIG. 4, an illustrative mobile device 400 and components thereof will be described. In some embodiments, the indoor mobile devices 104 and the outdoor mobile devices 108 described above with reference to FIG. 1 can be configured as and/or can have an architecture similar or identical to the mobile device 400 described herein in FIG. 4. It should be understood, however, that the mobile device 102 may or may not include the functionality described herein with reference to FIG. 4. While connections are not shown between the various components illustrated in FIG. 4, it should be understood that some, none, or all of the components illustrated in FIG. 4 can be configured to interact with one another to carry out various device functions. In some embodiments, the components are arranged so as to communicate via one or more busses (not shown). Thus, it should be understood that FIG. 4 and the following description are intended to provide a general understanding of a suitable environment in which various aspects of embodiments can be implemented, and should not be construed as being limiting in any way.

As illustrated in FIG. 4, the mobile device 400 can include a display 402 for displaying data. According to various embodiments, the display 402 can be configured to display network connection information, various graphical user interface ("GUI") elements, text, images, video, virtual keypads and/or keyboards, messaging data, notification messages, metadata, Internet content, device status, time, date, calendar data, device preferences, map and location data, combinations thereof, and/or the like. The mobile device 400 also can include a processor 404 and a memory or other data storage device ("memory") 406. The processor 404 can be configured to process data and/or can execute computer-executable instructions stored in the memory 406. The computer-executable instructions executed by the processor 404 can include, for example, an operating system 408 and one or more applications 410, which may include one or more applications configured to collect at least a portion of the geo-location data, the radio signal measurement data, the telecommunications event features, and the flag values. In some embodiments, the applications 410 also can include a UI application (not illustrated in FIG. 4).

The UI application can interface with the operating system 408 to facilitate user interaction with functionality and/or data stored at the mobile device 400 and/or stored elsewhere. In some embodiments, the operating system 408 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 404 to aid a user in answering/initiating calls, data communications, entering/deleting data, entering and setting user IDs and passwords for device access, configuring settings, manipulating address book content and/or settings, multimode interaction, interacting with other applications 410, and otherwise facilitating user interaction with the operating system 408, the applications 410, and/or other types or instances of data 412 that can be stored at the mobile device 400. The data 412 can include, for example, at least a portion of the geo-location data, the radio signal measurement data, the telecommunications event features, and the flag values collected by the applications 410. According to various embodiments, the applications 410 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 410, the data 412, and/or portions thereof can be stored in the memory 406 and/or in a firmware 414, and can be executed by the processor 404. The firmware 414 also can store code for execution during device power up and power down operations. It can be appreciated that the firmware 414 can be stored in a volatile or non-volatile data storage device including, but not limited to, the memory 406 and/or a portion thereof.

The mobile device 400 also can include an input/output ("I/O") interface 416. The I/O interface 416 can be configured to support the input/output of data such as location information, presence status information, user IDs, passwords, and application initiation (start-up) requests. In some embodiments, the I/O interface 416 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 400 can be configured to synchronize with another device to transfer content to and/or from the mobile device 400. In some embodiments, the mobile device 400 can be configured to receive updates to one or more of the applications 410 via the I/O interface 416, though this is not necessarily the case. In some embodiments, the I/O interface 416 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 416 may be used for communications between the mobile device 400 and a network device or local device.

The mobile device 400 also can include a communications component 418. The communications component 418 can be configured to interface with the processor 404 to facilitate wired and/or wireless communications with one or more networks. In some embodiments, other networks include networks that utilize non-cellular wireless technologies such as WI-FI or WIMAX. In some embodiments, the communications component 418 includes a multimode communications subsystem for facilitating communications via the cellular network and one or more other networks.

The communications component 418, in some embodiments, includes one or more transceivers. The one or more transceivers, if included, can be configured to communicate over the same and/or different wireless technology standards with respect to one another. For example, in some embodiments one or more of the transceivers of the communications component 418 may be configured to communicate using GSM, CDMAONE, CDMA2000, LTE, and various other 2G, 2.5G, 3G, 4G, and greater generation technology standards. Moreover, the communications component 418 may facilitate communications over various channel access methods (which may or may not be used by the aforementioned standards) including, but not limited to, TDMA, FDMA, W-CDMA, OFDM, SDMA, and the like.

In addition, the communications component 418 may facilitate data communications using GPRS, EDGE, the HSPA protocol family including HSDPA, EUL or otherwise termed HSUPA, HSPA+, and various other current and future wireless data access standards. In the illustrated embodiment, the communications component 418 can include a first transceiver ("TxRx") 420A that can operate in a first communications mode (e.g., GSM). The communications component 418 also can include an $N^{th}$ transceiver ("TxRx") 420N that can operate in a second communications mode relative to the first transceiver 420A (e.g., UMTS). While two transceivers 420A-N (hereinafter collectively and/or generically referred to as "transceivers 420") are shown in FIG. 4, it should be appreciated that less than two, two, and/or more than two transceivers 420 can be included in the communications component 418.

The communications component 418 also can include an alternative transceiver ("Alt TxRx") 422 for supporting other types and/or standards of communications. According to various contemplated embodiments, the alternative transceiver 422 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 418 also can facilitate reception from terrestrial radio networks, digital satellite radio networks, internet-based radio service networks, combinations thereof, and the like. The communications component 418 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 400 also can include one or more sensors 424. The sensors 424 can include temperature sensors, light sensors, air quality sensors, movement sensors, accelerometers, magnetometers, gyroscopes, infrared sensors, orientation sensors, noise sensors, microphones proximity sensors, combinations thereof, and/or the like. Additionally, audio capabilities for the mobile device 400 may be provided by an audio I/O component 426. The audio I/O component 426 of the mobile device 400 can include one or more speakers for the output of audio signals, one or more microphones for the collection and/or input of audio signals, and/or other audio input and/or output devices.

The illustrated mobile device 400 also can include a subscriber identity module ("SIM") system 428. The SIM system 428 can include a universal SIM ("USIM"), a universal integrated circuit card ("UICC") and/or other identity devices. The SIM system 428 can include and/or can be connected to or inserted into an interface such as a slot interface 430. In some embodiments, the slot interface 430 can be configured to accept insertion of other identity cards or modules for accessing various types of networks. Additionally, or alternatively, the slot interface 430 can be configured to accept multiple subscriber identity cards. Because other devices and/or modules for identifying users and/or the mobile device 400 are contemplated, it should be understood that these embodiments are illustrative, and should not be construed as being limiting in any way.

The mobile device 400 also can include an image capture and processing system 432 ("image system"). The image system 432 can be configured to capture or otherwise obtain photos, videos, and/or other visual information. As such, the image system 432 can include cameras, lenses, charge-coupled devices ("CCDs"), combinations thereof, or the like. The mobile device 400 may also include a video system 434. The video system 434 can be configured to capture, process, record, modify, and/or store video content. Photos and videos obtained using the image system 432 and the video system 434, respectively, may be added as message content to an MMS message, email message, and sent to another mobile device. The video and/or photo content also can be shared with other devices via various types of data transfers via wired and/or wireless communication devices as described herein.

The mobile device 400 also can include one or more location components 436. The location components 436 can be configured to send and/or receive signals to determine a geographic location of the mobile device 400. According to various embodiments, the location components 436 can send and/or receive signals from global positioning system ("GPS") devices, assisted-GPS ("A-GPS") devices, WI-FI/WIMAX and/or cellular network triangulation data, combinations thereof, and the like. The location component 436 also can be configured to communicate with the communications component 418 to retrieve triangulation data for determining a location of the mobile device 400. In some embodiments, the location component 436 can interface with cellular network nodes, telephone lines, satellites, location transmitters and/or beacons, wireless network transmitters and receivers, combinations thereof, and the like. In some embodiments, the location component 436 can include and/or can communicate with one or more of the sensors 424 such as a compass, an accelerometer, and/or a gyroscope to determine the orientation of the mobile device 400. Using the location component 436, the mobile device 400 can generate and/or receive data to identify its geographic location, or to transmit data used by other devices to determine the location of the mobile device 400. The location component 436 may include multiple components for determining the location and/or orientation of the mobile device 400.

The illustrated mobile device 400 also can include a power source 438. The power source 438 can include one or more batteries, power supplies, power cells, and/or other power subsystems including alternating current ("AC") and/or direct current ("DC") power devices. The power source 438 also can interface with an external power system or charging equipment via a power I/O component 440. Because the mobile device 400 can include additional and/or alternative components, the above embodiment should be understood as being illustrative of one possible operating environment for various embodiments of the concepts and technologies described herein. The described embodiment of the mobile device 400 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of the any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 400 or other devices or computers described herein, such as the computer system 300 described above with reference to FIG. 3. For purposes of the claims, the phrase "computer-readable storage medium" and variations thereof, does not include waves, signals, and/or other transitory and/or intangible communication media, per se. In an illustrative embodiment, a computer-readable storage medium is a tangible computer-readable storage medium.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the mobile device 400 in order to store and execute the software components presented herein. It is also contemplated that the mobile device 400 may not include all of the components shown in FIG. 4, may include other components that are not explicitly shown in FIG. 4, or may utilize an architecture completely different than that shown in FIG. 4.

Based on the foregoing, it should be appreciated that concepts and technologies that involve the classification of indoor and outdoor telecommunications events that occur within mobile telecommunications networks have been disclosed herein. Although the subject matter presented herein has been described in language specific to computer structural features, methodological and transformative acts, specific computing machinery, and computer-readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the subject disclosure.

We claim:

1. A method comprising:
   receiving, by a computer system comprising a processor, a data set comprising geo-location data and radio signal measurement data for a telecommunications event that has occurred within a mobile telecommunications network;
   providing, by the computer system, the data set as input to a classification model executing on the computer system; and
   classifying, by the classification model executing on the computer system, the data set into one results subset selected from a group of subsets comprising an indoor results subset and an outdoor results subset, wherein the telecommunications event is classified into the indoor results subset when the telecommunications event is determined to have occurred in an indoor location, and wherein the telecommunications event is classified into the outdoor results subset when the telecommunications event is determined to have occurred in an outdoor location.

2. The method of claim 1, wherein the data set further comprises a telecommunications event feature for the telecommunications event.

3. The method of claim 1, wherein the data set further comprises a flag value for the telecommunications event.

4. The method of claim 1, further comprising receiving, by the computer system, the indoor results subset as output from the classification model.

5. The method of claim 4, further comprising presenting the indoor results subset.

6. The method of claim 1, further comprising receiving, by the computer system, the outdoor results subset as output from the classification model.

7. The method of claim 6, further comprising presenting the outdoor results subset.

8. A computer system comprising:
   a processor; and
   a memory comprising a classification model and computer-executable instructions that, when executed by the processor, cause the processor to perform operations comprising
      receiving a data set comprising geo-location data and radio signal measurement data for a telecommunications event that has occurred within a mobile telecommunications network,
      providing the data set as input to the classification model executing on the computer system, and
      classifying, by the classification model executing on the computer system, the data set into one results subset selected from a group of subsets comprising an indoor results subset and an outdoor results subset, wherein the telecommunications event is classified into the indoor results subset when the telecommunications event is determined to have occurred in an indoor location, and wherein the telecommunications event is classified into the outdoor results subset when the telecommunications event is determined to have occurred in an outdoor location.

9. The computer system of claim 8, wherein the data set further comprises a telecommunications event feature and a flag value for the telecommunications event.

10. The computer system of claim 8, wherein the operations further comprise:
    receiving the indoor results subset as output from the classification model; and
    presenting the indoor results subset.

11. The computer system of claim 10, wherein presenting the indoor results subset comprises presenting the indoor results subset in a spreadsheet.

12. The computer system of claim 10, wherein presenting the indoor results subset comprises presenting the indoor results subset on a display.

13. The computer system of claim 12, wherein presenting the indoor results subset on the display comprises presenting the indoor results subset within a map presented on the display.

14. A computer-readable storage medium comprising computer-executable instructions that, when executed by a processor of a computer system, cause the processor to perform operations comprising:
    receiving a data set comprising geo-location data and radio signal measurement data for a telecommunications event that has occurred within a mobile telecommunications network;
    providing the data set as input to a classification model executing on the computer system; and
    classifying the data set into one results subset selected from a group of subsets comprising an indoor results subset and an outdoor results subset, wherein the telecommunications event is classified into the indoor results subset when the telecommunications event is determined to have occurred in an indoor location, and wherein the telecommunications event is classified into the outdoor results subset when the telecommunications event is determined to have occurred in an outdoor location.

15. The computer-readable storage medium of claim 14, wherein the data set further comprises a telecommunications event feature for the telecommunications event.

16. The computer-readable storage medium of claim 14, wherein the data set further comprises a flag value for the telecommunications event.

17. The computer-readable storage medium of claim 14, wherein the operations further comprise receiving the indoor results subset as output from the classification model.

18. The computer-readable storage medium of claim 17, wherein the operations further comprise presenting the indoor results subset.

19. The computer-readable storage medium of claim 14, wherein the operations further comprise receiving the outdoor results subset as output from the classification model.

20. The computer-readable storage medium of claim 19, wherein the operations further comprise presenting the outdoor results subset.

\* \* \* \* \*